(No Model.)
G. W. COOLEY & H. F. LOGEE.
WATER INDICATOR AND ALARM.
No. 578,725. Patented Mar. 16, 1897.
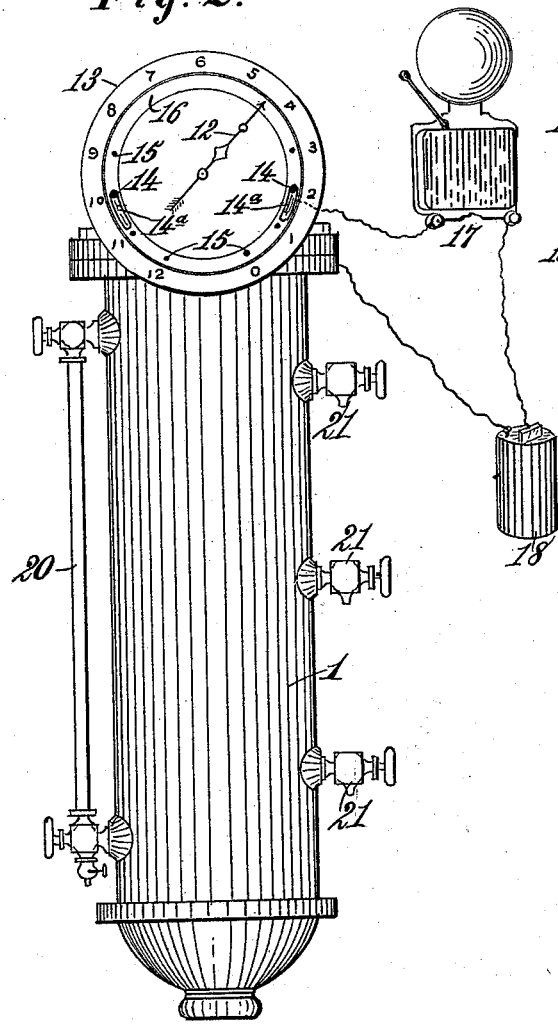
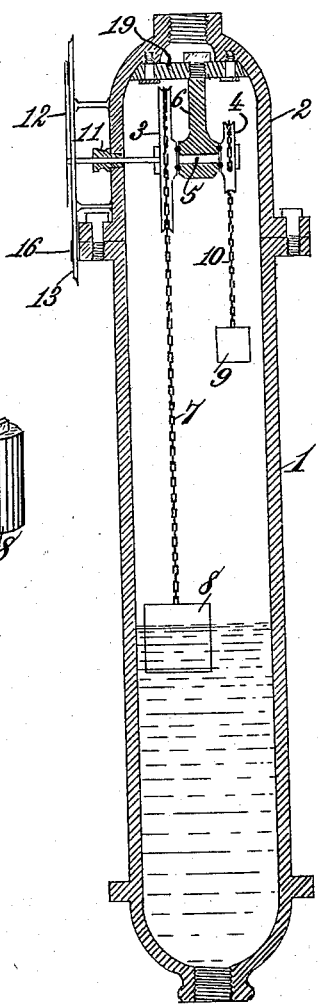
Witnesses
Inventors
George W. Cooley.
Henry F. Logee.
By James L. Norris.
Atty.

UNITED STATES PATENT OFFICE.

GEORGE W. COOLEY AND HENRY F. LOGEE, OF MINNEAPOLIS, MINNESOTA.

WATER-INDICATOR AND ALARM.

SPECIFICATION forming part of Letters Patent No. 578,725, dated March 16, 1897.

Application filed August 15, 1895. Serial No. 559,413. (No model.)

*To all whom it may concern:*

Be it known that we, GEORGE W. COOLEY and HENRY F. LOGEE, citizens of the United States, residing at Minneapolis, in the county of Hennepin and State of Minnesota, have invented new and useful Improvements in a Water-Indicator and Alarm, of which the following is a specification.

This invention relates to mechanism for indicating the height of water in steam-boilers, tanks, and the like and for sounding an alarm automatically when the water gets too high or too low, the principal object being to provide for a steam-boiler a simple and reliable water-indicator and alarm that will not be affected or rendered useless by foaming and priming.

The invention consists in the features of construction and novel combinations of parts in an automatic water-indicator and alarm, as hereinafter more particularly described and claimed.

In the annexed drawings, illustrating the invention, Figure 1 represents a vertical longitudinal section of a water-chamber adapted for connection with a steam-boiler (not shown) and having mounted therein the gearing and attached weights through which the water-indicator and alarm are actuated. Fig. 2 is an elevation of the water-chamber and attached indicator and alarm viewed at a right angle to Fig. 1.

The water-chamber 1 is arranged for connection with a steam-boiler or tank in any suitable or usual manner, and preferably comprises a detachable dome-shaped cap 2, constructed for support of the indicator and connected gearing and weights. The gearing comprises two wheels 3 and 4, fixed on a common horizontally-arranged shaft 5, and journaled therewith by antifriction-bearings upon or into a hanger 6, supported inside the dome of the water-chamber in any convenient manner. These wheels 3 and 4 have different diameters, the proportions of which may be made to suit the normal depth of water in the chamber. As shown in Fig. 1, the proportion is two to one, the wheel 3 being the larger.

To the circumference of the wheel 3 is fixed one end of a sufficiently long chain, cord, or band 7, which passes once around the wheel and has attached to its lower end a weight 8, that is made solid and composed of material having a specific gravity greater than but as near that of water as is consistent with the service required, the object of employing a weight of comparatively low specific gravity being to displace as large a quantity of water as possible by the partial submergence of the weight. This weight 8 is maintained at the surface of the water by the action of a counterweight 9, attached to one end of a shorter chain, cord, or band 10, the other end of which is secured to the wheel 4, over which the said chain 10 is passed in a direction opposite to the arrangement of the chain 7 on the other wheel.

The weight 9 is made solid and of a heavy material having as high a specific gravity as possible so as to occupy a small space, the proportioning of the weights, chains, and wheel leverage being just sufficient to maintain an equipoise when the weight 8 is about two-thirds submerged. It will be observed that the weights 8 and 9 are suspended from chains of unequal length attached to opposite sides of the wheels on the shaft 5 and that while the weight 8 is always partially submerged the weight 9, being connected to the shorter chain and smaller wheel, will have a relatively slight movement and is constantly out of the water at any height to which the water can rise.

The partly-submerged weight 8 rises and falls with the water in the chamber 1, the counterweight 9 serving to keep the chains 7 and 10 taut, so that there will be imparted to the shaft 5 a steady movement corresponding with any change in the level of water in the chamber.

One end of the shaft 5 is extended through a stuffing-box 11 in the side of the chamber cap or dome 2, and on the outer end of the shaft is carried an index-finger 12, moving in front of a dial 13, graduated to a suitable scale. Thus at all times the rise and fall of the counterpoised and partly-submerged weight 8 will show, through the indicator-dial, the height of water in the chamber, and hence in the boiler, with which said chamber may be connected in any usual manner.

The weight 8 being suspended by a long chain 7 from the larger wheel 3 and the counterweight 9 being suspended by a short chain 10 from the smaller wheel 4, the relative movement of the counterweight will be very slight, and it will never descend so far as to become submerged, even when the water rises to its highest lever, it being understood, of course, that the wheels 3 and 4 and their shaft 5 are mounted at a suitable elevation in the top of a chamber 1 of proper height with relation to the highest level in the tank, cistern, or boiler with which the said chamber is to communicate.

When the water in the boiler, and consequently in the chamber, stands at an ordinary height or such a height as is customary or required to be maintained, the weight 8 hangs so that about two-thirds of it is submerged and is counterbalanced by the weight 9. Now as the water rises in the chamber the weight 8 is carried up with it, the equipoise being constantly maintained by the weight 9, which, owing to its being suspended from a short chain attached to the smaller wheel, moves only one-half of the distance passed through by the weight 8 and consequently does not at any time hang in the water. As the weight 8 moves upward the wheel 3 and shaft 5 revolve, carrying the pointer or index 12 around the dial-plate, so as to show at all times the true stage of water in the boiler or tank.

When the water rises too high, the index-hand 12 comes into contact with a pin or button 14, set in one of a series of holes 15 in a ring 16, attached to the dial-plate, and by an electrical-bell connection gives a suitable alarm. So, also, when the water falls in the chamber the same operation takes place and the low-water alarm is given at such point as may be required. For this purpose we have perforated the ring 16, which is attached to and insulated from the dial-plate proper, a series of holes 15 being formed in said ring at the figures "0," "1," "2," "3," "9," "10," "11," "12," into any of which holes may be inserted a plug, pin, or button 14, having an elongated head 14$^a$, over which the index-hand 12 passes, making close contact and sounding an alarm at any required stage of water, or holes may be made at any of the figures for the same purpose. The dial-plate is suitably insulated from the ring 16 and the connections made in such a manner as to give an alarm at any stage of water desired. It is preferable to have the head 14$^a$ of the plug 14 elongated, so as to keep the alarm sounding for some length of time. The alarm may comprise a bell 17 and battery 18, with suitable wires for completing electrical connections.

The water-chamber 1 may be provided with oval ends, as shown, or be made in any other form, and is preferably constructed with the dome 2, connected to the body portion by flanges and bolts, so as to be readily separable when required. All the gearing is attached to the inside of the cap or dome 2, so that it may easily be taken off or put on without disturbing the main chamber or its connection with the boiler. The hanger 6 is attached by a screw connection to a plate or bar 19, which is connected by screws to lugs cast on the inside of the dome, but may be connected in any manner on the inside of the cap.

It is preferable to provide the chamber 1 with the usual water-glass 20 and gage-cocks 21, but these may be dispensed with, if desired.

The advantage of using solid weights, as 8 and 9, instead of hollow floats is that the weights remain constant and do not absorb water, as is the case with hollow floats under pressure. We are aware that solid weights have been used before, but not in the manner as applied by us and herein shown and described.

This device can be used for stand-pipes, water-tanks, or feed-pumps, or may be connected directly to a boiler, &c., and to avoid any great length of chain the smaller wheel may be made as small as one-tenth the size of the larger wheel, the equipoise being then maintained by a weight ten times that of the partially-submerged weight, allowance being made for the weight of the water displaced. With this device the engineer has the following safeguards against a dangerous stage of water: first, the ordinary water-glass, which, however, is easily broken and which becomes unreliable in case of priming or foaming; second, the usual gage-cocks, which, under the same conditions, do not always certainly indicate the true stage of water; third, and most important, the indicator herein described, which, under any of the conditions of priming or foaming, shows clearly and plainly the true condition of water. He has also the additional advantage of being able to determine if the water is a single inch or any distance from that height which will produce the best results in making steam, and should his duties call him out of sight of the indicator while the water is rising or falling the sounding of the alarm will immediately attract his attention, and by using a plug with an elongated head the electrical connection and the alarm can be maintained for any desired length of time.

What we claim as our invention is—

1. In a differential water-indicator and alarm, the combination of a water-chamber having mounted therein a rotary shaft, two wheels of unequal diameter secured to said shaft, a partially-submerged weight suspended by a long chain from the larger wheel, a counterweight suspended by a short chain from the smaller wheel, an index-finger carried by the wheel-shaft, a dial-plate, an insulated ring supported by said plate and provided with series of holes adjacent to figures of the scale on the dial-plate, a plug adapted to be placed in either of said holes and provided with an elongated head for contact of the index-finger, and an electric alarm, substantially as described.

2. In a differential water-indicator and alarm, the combination of a water-chamber provided with a removable dome having a cross bar or plate supported in its upper part and a hanger attached to said bar, two wheels of unequal diameter fixed to a common shaft mounted in said hanger and provided with ball-bearings, a partially-submerged weight of low specific gravity suspended by a long chain from the larger wheel, a counterweight of high specific gravity suspended by a short chain from the smaller wheel, an index-finger carried by the wheel-shaft, an indicator-dial, and an alarm, substantially as described.

In testimony whereof we have hereunto set our hands in presence of two subscribing witnesses.

GEORGE W. COOLEY.
HENRY F. LOGEE.

Witnesses:
F. L. STRAW,
E. F. COMSTOCK.